United States Patent Office
3,476,696
Patented Nov. 4, 1969

3,476,696
POLYURETHANE COATINGS
Edward J. Quinn, Tonawanda, N.Y., assignor to Hooker Chemical Corporation, Niagara Falls, N.Y., a corporation of New York
No Drawing. Filed Mar. 28, 1966, Ser. No. 537,713
Int. Cl. C09d *3/72;* C08g *41/00, 5/18*
U.S. Cl. 260—19                                    23 Claims

ABSTRACT OF THE DISCLOSURE

There is disclosed an improved polyurethane composition produced by reacting an equivalent excess of an organic polyisocyanate with one equivalent of a polyhydroxy composition wherein the polyhydroxy composition comprises a polyol formed by adjusting the acidity of a hydroxyalkylated novolac resin of phenol and a carbonyl compound selected from the group consisting of an aldehyde and a ketone, with an acid phosphorus compound of the formula:

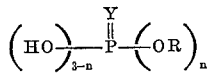

wherein $n$ is an integer from 1 to 2, R is a hydrocarbyl radical and Y is selected from the group consisting of oxygen and sulfur, to an acid number in the range of about 0.2 to about 10, and heating the resulting product to a temperature of at least 160 degrees centigrade. The polyurethane composition is useful in polyurethane coating compositions which can be applied to various substrates such as metal, wood, ceramics, glass, and to polymer compositions.

---

This invention relates to improved polyurethane coatings, to the process for making such coatings, and to the cured coatings that can be produced therefrom.

It is an object of this invention to provide novel polyurethane coating compositions that can be cured by atmospheric moisture or by suitable polyols to provide cured coatings that have excellent resistance to attack by solvents such as ketones and alcohols, and excellent storage stability. It is a further object of the invention to provide polyurethane coating compositions that cure to finish coatings that have an excellent balance of physical properties such as hardness, mar resistance, color, flexibility and wear resistance. These and other objects of the invention are apparent from the following detailed specification.

In accordance with this invention there is provided a polyurethane coating composition produced by reacting an equivalent excess of an organic polyisocyanate with one equivalent of a polyhydroxy composition wherein the polyhydroxy composition comprises a polyol formed by adjusting the acidity of a hydroxyalkylated phenol-aldehyde or phenolketone novolak resin with an acid phosphorus compound of the formula:

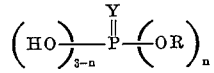

wherein $n$ is an integer from one to two, R is a hydrocarbyl radical, and Y is oxygen or sulfur, heating the resulting product to a temperature of at least 160 degrees centigrade to stabilize the ultimate polyurethane composition. Generally, the reaction of the organic polyisocyanate and polyol is carried out in the presence of a suitable solvent which also serves as a liquid medium or diluent for the polyurethane coating composition. The resulting products are readily curable by atmospheric moisture to provide the cured polyurethane coating. Alternatively, the products can be cured by reaction with suitable polyols.

Suitable hydroxyalkylated novolak resins for use in the invention are generally prepared by reacting a phenol with an aldehyde or ketone to provide the novolak resin, and thereafter reacting the phenolic hydroxyl group of the novolak resin with a suitable hydroxy-alkylation agent such as a monooxirane ring compound, an alkylene halohydrin or an alkylene carbonate. The novolak resins generally contain an average of three to about 10 phenolic nuclei per molecule, preferably an average of three to about seven phenolic nuclei per molecule and still more preferably from an average of three to about five phenolic nuclei per molecule. The phenol-aldehyde and phenol-ketone condensates are characterized by being soluble in organic solvents such as acetone, and should not be advanced to the insoluble C stage or resite stage.

The phenol for use in preparing the novolak resins for use in the invention is phenol itself, since hydrocarbon substituted phenols generally result in less desirable polyurethane coating compositions when used in the process of the invention. Any suitable aldehyde or mixtures of aldehydes capable of reacting with phenol and having up to about eight carbon atoms is satisfactory provided that it does not contain a functional group that is detrimental to the condensation reaction or to the subsequent steps of oxyalkylation and reaction with the organic polyisocyanate. The preferred aldehyde is formaldehyde, which can be an aqueous solution or in any of its lower polymeric forms such as paraform or trioxane. Other examples of suitable aldehydes are acetaldehyde, propionaldehyde, butyraldehyde, benzaldehyde, furfurylaldehyde, 2-ethylhexanal, ethylbutyraldehyde, heptaldehyde, and the like. The condensation of the phenols can also be carried out using an aliphatic ketone having three to eight carbon atoms in either aliphatic radical, such as acetone, methylethyl ketone, diethyl ketone, ethylpropyl ketone, dipropyl ketone, propylbutyl ketone, as well as cycloaliphatic ketones having five to eight carbon atoms, such as cyclopentanone, cyclohexanone, and cyclooctanone, and the like.

The condensation reaction of phenol and the aldehyde or ketone is preferably carried out in the presence of an acid catalyst, such as oxalic acid, maleic acid, hydrochloric acid, sulfuric acid, and the like. In general, any acid having a dissociation constant of greater than $1 \times 10^{-2}$ is useful as a catalyst for the condensation reaction. The reaction can also proceed without a catalyst. In such case, the aldehyde should be introduced beneath the surface of the liquid at a temperature of 150 to 180 degrees centigrade. It is generally preferable to conduct the reaction in the presence of an anionic-type wetting agent. such as a sodium alkyl aryl sulfonate. The phenol and aldehyde or ketone are generally reacted in a ratio of greater than 0.25 up to nearly one mole of aldehyde or ketone per mole of phenol, preferably in the range of about 0.4 to about 0.7 mole of aldehyde or ketone per mole of phenol, more preferably in the range of 0.6 to 0.7 mole per mole. The reaction is generally conducted at a temperature of about 95 to 100 degrees centigrade (reflux temperature) under atmospheric pressure. However, higher and lower pressures can be employed, and the reaction temperature can be adjusted to higher or lower levels as required. The reaction is continued until all the aldehyde or ketone is reacted, after which the reaction mixture is preferably dehydrated and dephenolated by distillation at atmospheric pressure or at reduced pressure to provide the desired novolak resin.

Hydroxyalkylation of the novolak resin is accomplished with a hydroxyalkylating agent such as a monooxirane ring compound, an alkylene halohydrin or an alkylene carbonate. Examples of monooxirane ring compounds are the monomeric 1,2-epoxides such as ethyleneoxide, propyleneoxide, butyleneoxide, isobutyleneoxide, 2,3-epoxyhexane, 3-ethyl-2,3-epoxyoctane, epichlorohydrin, epibromohydrin, styrene oxide, glycidyl ether, methyl glycidyl ether, phenyl glycidyl ether, glycidyl methyl sulfone, glycidyl methacrylate, glycidyl benzoate, glycidyl acetate, glycidyl sorbate, and the like. The preferred monoepoxides are the alkylene oxides of 2 to 6 carbon atoms. Suitable alkylene halohydrins include ethylene halohydrin, propylene halohydrin, and the like. Suitable alkylene carbonates include ethylene carbonate and propylene carbonate.

Catalysts for the hydroxyalkylation reaction include the alkali metal salts of aliphatic alcohols wherein the aliphatic group contains from one to 18 carbon atoms, including linear and branched chain alkyl groups. Examples of such catalysts are sodium methylate, potassium ethylate, sodium propylate, and the like. Other suitable catalysts include the salts of strong bases and weak acids, such as sodium acetate, potassium propionate and sodium benzoate. Other catalysts for the reactions include the alkali metal or alkaline earth hydroxides such as the hydroxides of sodium, potassium and calcium. In the foregoing description the alkali metals of interest are lithium, sodium, potassium, rubidium and cesium. The alkaline earth metals are calcium, barium and strontium. Especially useful catalysts when the hydroxyalkylating agent is an alkaline carbonate are the alkali metal carbonates such as sodium and potassium carbonate.

The hydroxyalkylation reaction is generally carried out at a temperature in the range of about 100 to 250 degrees centigrade, preferably at a temperature in the range of 150 to 200 degrees centigrade. Reaction pressures from atmospheric to 100 pounds per square inch absolute and higher can be employed. Pressures above atmospheric, for example, about 25 to 75 pounds per square inch absolute are preferred when using the lower alkaline oxides as hydroxyalkylating agents. The reaction time can vary considerably, for example, in the range of about one to five hours is usual. It is desired to employ sufficient hydroxyalkylating agent to react at least one molecule of hydroxyalkylating agent per phenolic hydroxyl group. Generally, the hydroxyalkylation agent is employed in a proportion to provide from one to about 10 moles of hydroxyalkylation agent per mole of phenolic hydroxyl group, preferably the ratio is in the range of one to about six moles of hydroxyalkylating agent per mole of phenolic hydroxyl group.

In accordance with the invention, the hydroxyalkylated phenol-aldehyde or phenol-ketone novolak resin is treated with an acid phosphorus compound to adjust the acidity of the resinous composition to an acid number in the range of about 0.2 to 10, depending upon the characteristics of the polyurethane coating composition that are desired. The preferred range of acid number is about 0.5 to 6. The desired acidity adjustment is achieved by treating the resinous composition with a phosphorus compound of the formula:

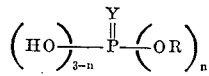

wherein $n$ is an integer from one to two, R is a hydrocarbyl radical, and Y is oxygen or sulfur. Suitable hydrocarbyl radicals are alkyl groups of 1 to 12 carbon atoms, cycloalkyl radicals of 6 to 12 carbon atoms, and aryl, alkaryl and aralkyl radicals of 6 to 12 carbon atoms. Typical examples of such acid phosphorus compounds are methyl phosphoric acid, methyl thionophosphoric acid, butyl phosphoric acid, butyl thionophosphoric acid, 2-ethylhexyl phosphoric acid, cyclohexyl phosphoric acid, cyclopentyl phosphoric acid, phenyl phosphoric acid, cresyl phosphoric acid, benzyl phosphoric acid, dimethyl phosphoric acid, dimethyl thionophosphoric acid, dibutyl phosphoric acid, dibutyl thionophosphoric acid, di(2-ethylhexyl) phosphoric acid, diphenyl phosphoric acid, methyl phenyl phosphoric acid, butyl phenyl phosphoric acid, dioctyl phosphoric acid, dodecyl phosphoric acid, phenyl benzyl phosphoric acid, methyl benzyl phosphoric acid, methyl cresyl phosphoric acid, and the like. Especially useful are the commercial mixtures of the foregoing first and second degree esters of phosphoric acids such as a mixture of butyl phosphoric acid and dibutyl phosphoric acid.

The desired acid phosphorus compound is mixed with the resinous composition in a suitable proportion to provide the desired acid number, and the composition is heated to a temperature of at least 160 degrees centigrade, preferably a temperature in the range of 170 to 190 degrees centigrade. Temperatures up to 220 degrees centigrade can be used, but are less preferred. Sufficient agitation is provided to insure good mixing of the acid phosphorus compound with the hydroxyalkylated novolak resin. Mixing is continued for a suitable length of time, generally in the range of about ten minutes to two hours or more. The resulting product can be filtered or centrifuged, if desired, to remove any solid particles present.

The resinous composition that results from the acid phosphorus treatment step is dissolved in a solvent that will provide a suitable carrier for the finished polyurethane coating composition. Suitable solvents include aromatic hydrocarbons such as toluene and xylene, esters of a carboxylic compound and an alcohol such as Cellosolve acetate, ethyl acetate, butyl acetate, ethyl propionate, ethyl butyrate, and the like, ketones, such as the aliphatic ketones having one to 8 carbon atoms per aliphatic group, for example, acetone, methyl ethyl ketone, dibutyl ketone, methyl hexyl ketone, and the like, and chlorinated hydrocarbons such as trichloroethylene, perchloroethylene, and the like. Generally, the suitable solvents for use in the invention have a boiling point in the range of about 50 to 200 degrees centigrade, preferably in the range of about 70 to 170 degrees centigrade. Generally, the solvent is employed in a proportion to provide about 10 to 80 weight percent solids or non-volatiles as determined by ASTM D-1644-59 (Method A). More usually the range is about 25 to 75 weight percent solids, ideally in the range of 50 to 75 weight percent solids to save on storage space.

To improve the storage stability of the final polyurethane coating compositions, the solutions of the acid treated hydroxyalkylated novolak resins are preferably dehydrated to reduce the water content thereof to a value of less than about 100 parts per million of water in the polyol solution. More preferably, the water content of the polyol solution is reduced to a value in the range of about 10 to about 75 parts per million of water in the polyol solution. The dehydration step is conveniently achieved by distilling a quantity of solvent from the polyol solution or by subjecting the polyol solution to an azeotrope distillation. Such distillation is generally carried out at a temperature in the range of 70 to 200 degrees centigrade and atmospheric pressure. However, higher and lower pressures, such as up to 30 pounds per square inch absolute can be used, and the temperature will vary accordingly. Preferably the distillation conditions are 70 to 160 degrees centigrade and atmospheric pressure. Other dehydration methods are useful including subjecting the polyol solution to chemical dehydrating agents such as molecular sieves, zeolites, and the like.

The acid treated hydroxyalkylated novolak resin is reacted with an organic polyisocyanate. Suitable polyisocyanates include the tolylene diisocyanates, particularly 2,4-tolylene diisocyanate; 2,6-tolylene diisocyanate and mixtures of the two isomers, especially mixtures of 80 percent of 2,4- isomer and 20 percent of 2,6- isomer. Crude mixtures which are commercially available are also useful. Other suitable polyisocyanates include methylene bis(4-phenyl isocyanate); hexamethylene diisocyanate;

1,5-naphthalene diisocyanate; 1,3-cyclopentylene diisocyanate; dimer acid diisocyanate; p-phenylene diisocyanate; 2,4,6-tolylene triisocyanate; 4,4′,4″-triphenylmethane triisocyanate, as well as crude commercial mixtures of such organic polyisocyanates.

The organic polyisocyanate and the polyyol component of the polyurethane composition are reacted in a suitable proportion to provide an excess of isocyanato groups based on the total number of hydroxyl groups and other equivalent groups, i.e., polycarboxylic, and the like. Generally the components are employed in a proportion to provide at least about 1.5 isocyanato groups per hydroxyl or equivalent groups. By equivalent groups is meant carboxylic acid, carboxylic anhydride, amine, and the like groups that are reactive with the isocyanato groups. Preferably, the ratio is in the range of about 1.7 to about 2.5 isocyanato groups per hydroxyl or equivalent groups. Generally, the polyol solution is added to the organic polyisocyanate, but the organic polyisocyanate can also be added to a body of the polyol solution. The reaction is preferably conducted at moderate temperatures in the range of about 25 to about 120 degrees centigrade, preferably temperatures in the range of 40 to about 80 degrees centigrade.

It is also within the invention to employ the hydroxyalkylated novolak resin in combination with another polyhydroxy composition. Suitable polyhydroxy compounds include esters such as glycerides of saturated and unsaturated fatty acids and hydroxy fatty acids, e.g., castor oil, and etherified products such as oxyalkylated sucrose, oxyalkylated glycerol, and the like. Other use combinations include combinations of the hydroxyalkylated novolak with a polyester resin or another polyether resin, or combinations of the three. Suitable polyesters of the reaction products of a polyhydric alcohol and a polycarboxylic compound, said polycarboxylic compound being either a polycarboxylic acid, a polycarboxylic acid anhydride, a polycarboxylic acid ester, a polycarboxylic acid halide or mixtures thereof. The carboxylic compounds can be aliphatic, cycloaliphatic, aromatic, or heterocyclic and either saturated or unsaturated. Among the polycarboxylic compounds which can be used to form the polyester are aliphatic acids such as adipic, succinic, glutaric, oxalic, and malonic. Other suitable acids include maleic, fumaric, phthalic, isophthalic, terephthalic, tetrachlorophthalic acid, chlorendic acid and the corresponding acid anhydrides, acid esters and acid halides. The preferred polyhydric alcohols are the difunctional alcohols such as ethylene glycol, propylene glycol, 1,4-butanediol, dipropylene glycol, other polypropylene glycols, butylene glycols, polybutylene glycols, and the like. The polycarboxylic compound and polyhydric alcohol are employed in a suitable ratio to provide the desired molecular weight polyester. The ratio of the polyhydric alcohol to the polybasic acid can be expressed as the hydroxyl-carboxyl ratio, which can be defined as the number of moles of hydroxyl groups to the number of moles of carboxyl groups in a given weight of resin. This ratio can be varied over a wide range, but generally is in the range of about 1.5:1 to 5:1.

Suitable polyethers for use in combination with the hydroxyalkylated novolak resin are the reaction products of (1) either a polyhydric alcohol or a polycarboxylic acid, and (2) a monomeric 1,2-epoxide having a single 1,2-epoxy group. The typical polyhydric alcohols, polycarboxylic acids and monoepoxides which can be employed in producing the polyethers are any of the polyhydric alcohols, polycarboxylic acids and monoepoxides listed hereinbefore. Other additives can be employed in combination with the hydroxyalkylated novolak resins of the invention to impart special properties to the coating compositions of the invention. Such additives include silicone additives to improve surface characteristics, and other properties of the cured film; pigments and dyes, and the like.

Various proportions of such polyesters and auxiliary polyether resins can be employed in the compositions of the invention. However, it is preferred that the hydroxyalkylated novolak resin comprise at least about 50 weight percent of the total polyol components.

The polyurethane coating compositions of the invention can be applied to various substrates such as metal, i.e., steel, aluminum, copper, brass, and the like, wood, ceramics, glass, and to polymer compositions. The coating compositions can be cured merely by exposure to atmospheric moisture. Alternatively, the coating compositions can be cured with the aid of a suitable polyol, such as a dihydric alcohol, e.g., ethylene glycol, propylene glycol, butanediol, dipropylene glycol, other polypropylene glycols, polybutylene glycols, and the like. Other polyols known in the art can also be employed.

The following examples serve to further illustrate the invention, but are not intended to limit it. All parts are by weight and temperatures are in degrees centigrade unless indicated otherwise.

Example 1.—Preparation of oxyethylated phenolic novolak 9,000 parts phenol, 38.2 parts maleic anhydride, and 12.9 parts of Nacconol NRSF (sodium alkyl aryl sulfonate) were charged to a reactor and heated to 90° C. A low nitrogen gas flow was maintained throughout the novolak polyol preparation except when operating under vacuum or under pressure. 3315 parts of 37.2 percent formaldehyde was added to the reaction mixture at such a rate as to maintain reflux. After all the formaldehyde had been added, the reaction mixture was refluxed for one hour or until a free formaldehyde content of less than 0.5 percent by weight was achieved. The reaction mixture was then dehydrated under partial vacuum (16 inches of mercury vacuum) until the reactor temperature exceeded 100° C. Full vacuum was then applied. The novolak was dehydrated and dephenolated at 190–200° C. and 40–45 mm. Hg; an exposure of one half hour to one hour under such conditions was sufficient to reduce the free phenol content to less than one percent by weight. Then, 10.2 parts of sodium hydroxide flake were added to the novolak at 190–210° C. The reactor was closed and 20 inches of mercury vacuum was pulled on the recator. The reactor was then sealed from the condenser and vacuum lines. 7133 parts of ethylene oxide were fed into the reactor through a sparger over a 3 to 4 hour period or at a rate sufficient to maintain a maximum pressure of 25 p.s.i.g. The reaction was exothermic and cooling was necessary to maintain reasonable temperatures. The reaction was then run for an additional period at 190–210° C. during which period the pressure in the reactor rapidly dropped to 5–10 p.s.i.g. The reactor was cooled to a temperature of 180° C. The reactor vacuum was broken with nitrogen gas and 34.3 parts of butyl acid phosphate mixture (a mixture containing by weight 48.5 percent monobutyl phosphate, 48.5 percent dibutyl phosphate, 3.0 percent phosphoric acid) were charged to the reactor. The reaction mixture was stirred for an additional period of 15 minutes. The resin was cooled to 150° C. and discharged. 12,933 parts of resin were obtained, which had a hydroxyl number of 278 and an acid number of 0.7. 25 parts by weight of the resin were dissolved in 50 parts by volume of Cellosolve acetate (ethylene glycol monoethyl ether acetate). Distilled water was added to this solution until a faint haze was observed, at which point a Beckman pH meter indicated a pH value of 6.2 for the resin. The phenolic hydroxyl content of the resin was $\leq 0.3$ percent by weight.

Examples 2 to 9

Additional polyols were prepared for use in making the polyurethane compositions of the invention, using the procedure of Example 1 with certain exceptions set forth hereinbelow, and the proportions of reactants and characteristics of the resins are shown in Table I.

TABLE I

| | Example Number | | | | | | | |
|---|---|---|---|---|---|---|---|---|
| | 2 | 3 | 4 | 5 | 6 | 7 | 8 | 9 |
| 37.2% formaldehyde parts by weight | 1,991 | 1,771<br>4,132 | 1,062 | 1,649 | 3,284<br>3,300 | 1,970 | 1,642<br>1,650 | 3,297 |
| Phenol, parts by weight | 4,050 | 3,600<br>8,401 | 2,360 | 4,500 | 9,000 | 5,400 | 4,500 | 9,000 |
| Oxalic acid, parts by weight | 20.3 | 18.0<br>42.0 | 11.8 | 22.5 | 45.0 | 27.0 | 22.5 | 45.0 |
| Nacconol NRSF, parts by weight | 8.1 | 7.2<br>16.8 | 4.8 | 9.0 | 18.0 | 10.8 | 9.0 | 18.0 |
| Parts by weight of hydroxylating agent | ²6,963<br>¹7,899 | ¹7,670<br>¹1,006 | ²1,850 | ¹6,451 | ¹9,161 | ¹10,207 | ²7,768 | ¹8,800 |
| Sodium acetate catalyst, parts by wt | 16.9 | 14.2<br>124.3 | 6.9 | 14.2 | 30.6<br>31.0 | 18.4 | 15.3<br>15.5 | 28.3 |
| Color of resin | (³) | (⁴) | (⁴) | (⁴) | (⁴) | (⁴) | (⁴) | (⁴) |
| Hydroxyl number of resin | 187 | 157 | ²225<br>¹161 | 155 | 223 | 149 | 168 | 228 |
| Alkaline number of resin | 0.2 | 1.6 | 0.1<br>0.1 | 0.3 | 0.5 | 0.1 | 0.3 | 0.6 |

| Acid | Butyl acid phosphate | Butyl acid phosphate | Butyl acid phosphate | By Treatment of Resin Solutions, Refer to Table IV | Butyl acid phosphate |
|---|---|---|---|---|---|
| Parts by weight of resin acidified | 1,065 | 1,000 | 1,065 | By treatment of resin solutions, refer to Table IV. | 3,500 |
| Parts by weight of 100% acid | 11.80 | 3.51 | 3.73 | By treatment of resin solutions, refer to Table IV. | 12.72 |
| Resin after acidification | 3A | 4A | 5A | By treatment of resin solutions, refer to Table IV. | 9A |
| Hydroxyl number after acidification | 157 | 157 | 156 | By treatment of resin solutions, refer to Table IV. | |
| Acid number after acidification | 2.3 | 0.4 | 0.8 | By treatment of resin solutions, refer to Table IV. | (⁵) |

¹ Ethylene oxide.
² Propylene oxide.
³ Med. amber.
⁴ Light amber.
⁵ By pH meter 9.12 g. of acidified resin dissolved in 100 ml. boiled distilled water exhibited a pH of 4.6.

TABLE IA

| | Example Number | | |
|---|---|---|---|
| | 2A | 2B | 2C |
| Polyol of Example 2 ¹ treated with acid | (²) | (³) | (⁴) |
| Parts by weight of polyol acidified | 450 | 400 | 500 |
| Parts by weight of 100% acid | 4.0 | 8.24 of 50% acid | 7.47 |
| Hydroxyl number after acidification | 181 | 184 | 177 |
| Acid number after acidification | 5.3 | 3.0 | 5.2 |
| Color of resin, Gardner | | ⁵>18 | |

¹ In Examples 2A and 2B, a polyol prepared in manner of Example 2, having a hydroxyl number of 187, but having an alkaline number of 1.0 of was employed.
² Acetic acid.
³ Sulfuric acid.
⁴ Butyl acid phosphate.
⁵ Black opaque.

In Examples 2 to 9, the maleic anhydride and sodium hydroxide reagents were replaced with oxalic acid and sodium acetate, respectively. In Examples 2 to 5, the resins were recovered in alkaline condition and then acid treated in a subsequent step by heating a mixture of the acid and resin for one hour at 180 to 185 degrees centigrade with agitation, and while maintaining a nitrogen gas flow through the system. The resin prepared in Example 2 was treated with butyl acid phosphate in accordance with the invention, and also with glacial acetic acid and a weight percent solution of sulfuric acid for comparative purposes. The butyl acid phosphate employed in Examples 2 to 9 comprised a mixture of 48.5 weight percent monobutyl acid phosphate, 48.5 weight percent dibutyl acid phosphate and 3 weight percent phosphoric acid.

In Examples 6 to 8, the alkaline resins were prepared, and subsequent acid treatment was deferred until after the resins were diluted with a solvent, the procedure for which is described hereinafter in Examples 21 to 23.

In Example 9, 3,500 parts by weight of the alkaline resin, 12.72 parts by weight of butyl acid phosphate and 65.7 parts by weight of acetone were heated to 150 degrees centigrade. This temperature was maintained for one and one third hours with agitation and with nitrogen gas flow through the system. 54.6 parts by weight of distillate were recovered.

Example 10

Other useful resins are prepared by reacting the novolak of Example 1 with ethylene chlorohydrin in the presence of aqueous sodium hydroxide solution and ethanol solvent. The reaction mixture is refluxed until free of phenolic hydroxyl, the alcohol is distilled off, and the resin is washed with water and dried.

Other useful resins are prepared by reacting the novolak of Example 1 with ethylene carbonate in the presence of potassium carbonate until the resin is free of phenolic hydroxyl.

Example 11.—Preparation of urethane composition 2,316 parts by weight toluene diisocyanate (a mixture containing 20 parts by weight of 2,6-toluene diisocyanate and 80 parts by weight of 2,4-toluene diisocyanate and containing a total of 26.62 isocyanate equivalents), and 463 parts by weight of Cellosolve acetate were charged to a 12 liter flask through which a nitrogen gas flow was initiated and maintained. Thereafter, 6,166 parts by weight of resin solution, containing 13.90 moles of hydroxyl as determined from the resin hydroxyl number, was charged to an addition funnel connected to the 12 liter reaction flask. The resin solution was prepared as follows: 2805 parts by weight of resin prepared in Example 1 and 4042 parts by weight of Cellosolve acetate were charged to and mixed in a flask under a nitrogen blanket. With heating and stirring (681 parts by weight of Cellosolve acetate were distilled off at atmospheric pressure for the purpose of removing traces of water. The resin solution was added to the reaction flask over a period of four and three fourth hours while maintaining the reaction temperature at 38–

50° C. followed by a digestion and stirring period of one and three fourth hours maintained at 38–45° C., followed by an increase in the reaction temperature from 40° C. to 80° C., followed by a final digestion and stirring period of two and one half hours with the temperature maintained at 79–80° C. Upon cooling the reaction mixture to room temperature, 13.64 isocyanate moles were found to have reacted as determined using a standard titration method for isocyanate groups employing dibutylamine. The urethane composition was filtered and the following properties were obtained for the finished product:

Vehicle non-volatiles _____ percent by weight 40.5
Viscosity—Gardner _____ A
Color—Gardner _____ 7+
Weight/gallon _____ lbs./gallon 8.6
Percent NCO by weight _____ 3.92

The finished product was found to cure in the presence of atmospheric moisture and to adhere well to a wood substrate. A sand abrasion co-efficient of 52 liters/mil (ASTM–D–968–51) was found for the product. The finished product was found to cure with atmospheric moisture and when cured as a thin coating on glass substrate was found to exhibit good resistance to water, inorganic acids and inorganic bases. Unexpectedly, good resistance properties were found for the cured finished product with respect to its resistance to alcohols, ketones and acetic acid as evidenced by the data presented in Table II. Comparison was made with a commercial polyurethane coating.

A Sand Abrasion Coefficient of 50 liters/mil (ASTM–D–968–51) was found for the cured product.

Urethane composition prepared in Examples 11 and 12 were tested after storage for a period of 243 days for the product of Example 11 and 240 days for the product of Example 12. The following properties were found:

|  | Example 11 | Example 12 |
|---|---|---|
| Vehicle non-volatile | 40.3% by weight | 40.1% by weight. |
| Viscosity Gardner | A | A–; |
| Color Gardner | 8+ | 8+; |
| Percent NCO by weight | 3.80 | 3.59. |

These results clearly show that the compositions of the invention possess excellent shelf life over prolonged periods of time.

Examples 13 to 19

Additional polyurethane compositions were prepared using the resin prepared as in Example 2 prior to acid treatment, and using acid treated resins 2A, 2B, 2C, 3A, 4A and 5A. The reagents, proportions of reagents and properties of the resulting compositions are tabulated in Table III.

In Example 13, the polyol prepared in Example 2, having a hydroxyl number of 187 and an alkaline number of 0.2, was heated to 180 to 183 degrees centigrade for one hour to simulate the heat treatment step even though no acidification with an acid phosphorus compound was performed. The heat treated polyol was filtered and had a Gardner color of 7 to 8. The polyol was then dissolved

TABLE II

| Reagent | Exposure Period | Product of Example 11 | Commercial Product A |
|---|---|---|---|
| 2B ethanol | 17 days | No effect | High swelling, distortion, loss of adhesion. |
| Methanol, CP | 7 days | do | Disintegration noted. |
| Acetone, CP | 90 minutes | do | Do. |
| Methyl ethyl ketone, CP | 5 days | do | Do. |
| Glacial acetic acid, CP | 90 minutes | do | High swelling, distortion, loss of adhesion. |
| Xylene (mixed isomers) | 4 days | do | Softens. |

Example 12.—Preparation of urethane composition

The procedure of Example 11 was repeated, except that an auxiliary polyol was used in combination with the polyol of Example 1, and different proportions of components were used as follows. The polyol component comprised 2121 parts by weight of the resin of Example 1, and 709 parts by weight of castor oil having a hydroxy number of 164 and an acid number of 0.8. 3057 parts of Cellosolve acetate were employed as the solvent. 506 parts of Cellosolve acetate were distilled from the resin solution, which was then reacted with 2093 parts by weight of toluene diisocyanate that had been mixed with 419 parts of Cellosolve acetate. When 12.77 isocyanate equivalents had reacted, the solution was diluted with 3692 parts by weight of xylene. After filtration, the following properties were noted for the urethane composition:

Vehicle non-volatile _____ percent by weight __ 39.7
Viscosity—Gardner _____ A
Color—Gardner _____ 6+
Weight/gallon _____ 8.5
NCO _____ percent by weight __ 3.78

The finished product was found to cure with atmospheric moisture and as a thin coating on glass substrate exhibited similar superior resistance properties found for the finished product of Example 11. The finished product was found to adhere well to wood and metal substrates.

in 206.5 parts of Cellosolve acetate and 291.3 parts xylene. The solution was refluxed for one hour, 43 minutes and 54.7 parts of xylene were removed. The water content of the resulting solution was 10 parts per million. The addition of 735.4 parts of polyol solution (containing 946 millimoles of hydroxyl) to 165.3 parts of tolylene diisocyanate (1900 millimoles of isocyanate) was commenced at a temperature of 41 degrees centigrade. The reaction temperature rose rapidly and cooling was applied. The reaction mixture gelled in 41 minutes, after about one-third of the polyol solution had been added to the isocyanate.

In Example 14, the oxyalkylated novolak that had been treated with acetic acid as described hereinbefore was employed to prepare a polyurethane composition. 317.2 parts of polyol were filtered and were dissolved in 215 parts of Cellosolve acetate and 258.4 parts of xylene. The polyol solution was refluxed for 1.5 hours and 43.4 parts of xylene were removed. The resulting solution contained only 15 parts per million of water. 730 parts of polyol solution (containing 1000 millimoles of hydroxyl) were added to and reacted with 170.8 parts of tolylene diisocyanate (1963 isocyanate millimoles) at 39 to 43 degrees centigrade over a 2 hour period. The mixture was digestion stirred for 20 minutes at 39 to 40 degrees and then cooled. The polyurethane was maintained under a nitrogen atmosphere, and gelled on standing overnight.

In Examples 16, 17, 18 and 19,

TABLE III

| | Example | | | | | |
|---|---|---|---|---|---|---|
| | 13 | 14 | 16 | 17 | 18 | 19 |
| Resin from Table I | 2 | 2A | 2C | 3A | 4A | 5A |
| Resin, parts by weight | 305.0 | 317.3 | 305.0 | 193.7 | 372 3. | 374.6 |
| Cellosolve acetate, parts by wt | 206.5 | 215 | 206.5 | 109.5 | 241.2 | 242.3 |
| Xylene, parts by weight | 291.3 | 258.4 | 291.3 | 178.7 | 327.2 | 328.2 |
| Parts by wt., solvent distilled | 54.7 | 43.4 | 54.7 | 42 | 55 | 55 |
| Parts by wt. of resin solution reacted with TDI | | 730 | 735.4 | 410.7 | 850.3 | 855.0 |
| Millimoles of hydroxyl available from resin solution for reaction based on hydroxyl No | | 1,000 | 946 | 500 | 1,000 | 1,000 |
| Resin solution wash solvent (pts. by wt.) | | | 30 | 30 | 30 | 30 |
| Toluene diisocyanate, pts. by wt | | 170.8 | 165.3 | 83.3 | 165.6 | 165.7 |
| Initial millimoles of isocyanate | | 1,963 | 1,900 | 957 | 1,903 | 1,905 |
| Millimoles of isocyanate reacted in preparation | | | 967 | 497 | 996 | 998 |
| Weight per gallon, lbs./gallon | | | | | 8.61 | 8.71 |
| Gardner color viscosity | | | 4+, C− | 1+, H | 2+, G− | 3+, B+ |
| Percent NCO by weight | | | 4.21 | 3.69 | 3.64 | 3.63 |
| Percent non-volatile by weight | | | 49.9 | 49.8 | 49.2 | 49.2 |
| Taber abrasion index | | | | 7 | 18 | 8 |

| | Time | Temperature | Viscosity, centipoises |
|---|---|---|---|
| Brookfield viscosities: | | | |
| Example 17 | Initial | 26 | 246 |
| | 23 days | 25 | 306 |
| Example 18 | Initial | 26 | 206 |
| | 5 days | 25 | 230 |
| Example 19 | Initial | 26 | 105 |
| | 20 days | 25 | 196 | the resins were dissolved in "urethane grade" Cellosolve acetate and technical grade mixed xylene isomers. The resin solutions were distilled to remove a portion of the xylene solvent. The resulting solutions were added to a tolylene diisocyanate mixture (80 weight percent 2,4-tolylene diisocyanate and 20 weight percent 2,6-tolylene diisocyanate) in a manner similar to that employed in Examples 11 and 12. Cellusolve acetate wash solvent was employed. Heating cycles were generally in the range of 40 to 60 degrees centigrade. No solvent was charged with the isocyanate. The milliequivalents of isocyanate reacted were obtained by dibutylamine titration method for determining concentration of free isocyanate. The weight per gallon was obtained using a Gardner density cup. The "percent NCO by weight" of the coating composition was obtained by the dibutylamine titration method. The nonvolatiles were obtained by heating 1 to 2 grams of the composition for 1.5 hours in a forced draft oven at 150 degrees centigrade. The coating compositions were applied to metal panels, and cured with atmospheric moisture. The taber abrasion index was obtained using a CS-10 wheel, 1000 gram weights, 30 cycle pregrind, 500 cycle grind calculated to milligrams lost per 1000 cycles.

Example 20.—Effect of temperature

Preparation of another polyurethane composition was begun by mixing 1300 parts by weight of resin 9A, 650 parts by weight of Cellosolve acetate and 700 parts by weight of xylene. The mixture was refluxed for 1.5 hours. 43.4 parts by weight of xylene and 0.5 part by weight of water were removed by distillation. 1987.2 parts by weight of the resulting resin solution were charged to 609 parts by weight of tolylene diisocyanate isomers (80% 2,4- and 20% 2,6-isomers). The addition was made over a 1 hour, 12 minute period at a temperature of 35 to 39 degrees centigrade. The mixture was stirred at 38 to 41 degrees centigrade. After 95 minutes, the polyurethane composition gelled. Analysis showed that only 23 parts by weight of water were present, an insufficient amount to gel the composition. However, the resin had been heated with butyl acid phosphate at 150 degrees centigrade, which has been found to be too low a temperature to provide useful compositions.

Examples 21 to 23

Additional polyurethane compositions were prepared by adding butyl acid phosphate to resin solutions prepared from the resins of Examples 6 and 8 and urethane grade Cellosolve acetate or xylene as shown in Table IV.

TABLE IV

| | Example | | |
|---|---|---|---|
| | 21 | 22 | 23 |
| Resin of Example | 6 | 8 | 8 |
| Resin parts by weight | 281.6 | 322.2 | 322.2 |
| Cellosolve acetate parts by wt | 732.2 | 837.7 | 837.7 |
| Parts by wt., butyl acid phosphate added prior to solvent removal | 1.18 | 0.79 | 0.79 |
| Millimoles of butyl acid phosphate | 9.92 | 6.64 | 6.64 |
| Millimoles sodium acetate in resin | 6.27 | 6.06 | 6.06 |
| Parts by weight Cellosolve acetate distilled | 169.0 | 120.9 | 193.1 |
| Parts by weight resin solution reacted with TDI | 755.8 | 876.0 | 876.0 |
| Millimoles hydroxyl from resin solution | 1,000 | 875 | 875 |
| Parts by weight of Cellosolve acetate as wash solvent, pts. by weight | 101.4 | 48.8 | 48.8 |
| Toluene diisocyanate parts by weight | 165.3 | 144.6 | 144.6 |
| Cellosolve acetate charged with TDI parts by weight | 52.7 | 22.4 | 22.4 |
| Millimoles of isocyanate available for reaction | 1,900 | 1,662 | 1,662 |
| Millimoles of isocyanate reacted | 1,032 | 855 | 849 |
| Gardner color viscosity | 3, A− | 1+, A− | 2+, A− |
| Percent NCO | 3.38 | 3.12 | 3.16 |
| Percent non-volatile | 39.7 | 39.7 | 39.3 |
| Taber abrasion index | 23 | 36 | 37 |
| Sand abrasion coefficient | 48 | 68 | 74 |
| Other pertinent data | (1) | | |

[1] Gelled in 52 days.

A portion of the indicated solvent was distilled off at 145 to 160 degrees centigrade and atmospheric pressure. The resin solutions were added to tolylene diisocyanate as in Examples 11 and 12. Additional solvent was charged with the isocyanate, and the heating cycles were maintained in the range of 40 to 60 degrees centigrade. Other determinations were made as described in Examples 13 to 19. The coating compositions were applied to metal panels. Reagents, proportions and properties of the coating compositions and cured coatings were shown in Table IV. The sand abrasion coefficient was run in accordance with ASTM D-968-51 procedure.

Comparison of the results obtained in Examples 21 to 23 with the results of prior examples indicates that treatment of the resin with acid phosphate prior to solution of the resin is preferred over treatment of the resin solution with the acid phosphate.

The foregoing results show the excellent storage stability of the compositions and solvent resistance of the cured coatings of the invention. The coatings also exhibit good adhesion and chemical resistance, as well as having other useful physical properties, such as hardness and the like.

In preparing the polyurethane compositions of the invention, the reaction of the polyol component with the polyisocyanate can be facilitated by the use of an alkyltin carboxylate, especially a dialkyltin dicarboxylate, such as dibutyltin dilaurate, dibutyltin diacetate, dibutyltin dimaleate, and the like. The tin compound is preferably employed in the proportion of about 0.05 to 0.8 weight percent based on the total weight of polyol and polyisocyanate.

While the invention has been described with reference to certain specific embodiments, it will be recognized by those skilled in the art that many variations are possible without departing from the spirit and scope of the invention.

I claim:
1. A polyurethane composition produced by reacting an equivalent excess of an organic polyisocyanate with one equivalent of a polyhydroxy composition wherein the polyhydroxy composition comprises a polyol formed by adjusting the acidity of a hydroxyalkylated novolac resin of phenol and a carbonyl compound selected from the group consisting of an aldehyde and a ketone, wherein the hydroxyalkylated novolac has greater than 0.25 up to nearly 1 mole of carbonyl compound per mole of phenol and 1 to 10 moles of a hydroxyalkylating agent selected from the group consisting of monooxirane ring compounds, alkylene halohydrins and alkylene carbonates per mole of phenolic hydroxyl group, with an acid phosphorus compound of the formula:

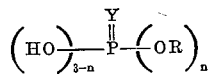

wherein $n$ is an integer from 1 to 2, R is a hydrocarbyl radical and Y is selected from the group consisting of oxygen and sulfur, to an acid number in the range of about 0.2 to about 10, and heating the resulting product to a temperature of at least 160 degrees centigrade.

2. The composition of claim 1 wherein the novolak resin is a product of phenol and an aldehyde.

3. The composition of claim 2 wherein the aldehyde is formaldehyde.

4. The composition of claim 2 wherein the hydroxyalkylated phenolaldehyde novolak resin is produced by reacting a phenol-aldehyde novolak resin with an alkylene oxide.

5. The composition of claim 2 wherein the organic polyisocyanate and the polyhydroxy composition are reacted in a proportion to provide at least about 1.5 isocyanato groups per hydroxyl or equivalent group.

6. The composition of claim 5 wherein the acid phosphorus compound is an alkyl acid phosphate.

7. The composition of claim 6 wherein the alkyl acid phosphate is butyl acid phosphate.

8. The composition of claim 7 wherein the butyl acid phosphate is a mixture of monobutyl acid phosphate and dibutyl acid phosphate.

9. The composition of claim 2 wherein the polyhydroxy composition also comprises an auxiliary polyhydroxy compound.

10. The composition of claim 9 wherein the auxiliary polyhydroxy compound is castor oil.

11. A polyurethane coating composition comprising the polyurethane composition of claim 1 and a solvent therefor.

12. The composition of claim 11 wherein the solvent has a boiling point in the range of about 50 to about 200 degrees centigrade.

13. The composition of claim 12 wherein the solvent is an aromatic hydrocarbon.

14. The composition of claim 13 wherein the aromatic hydrocarbon is xylene.

15. The composition of claim 12 wherein the solvent is an ester of a carboxylic compound and an alcohol.

16. The composition of claim 15 wherein the solvent is ethylene glycol monoethyl ether acetate.

17. A cured polyurethane coating prepared by subjecting the composition of claim 11 to atmospheric moisture.

18. A process for producing a polyurethane composition which comprises:
(1) adjusting the acidity of a hydroxyalkylated novolac resin of phenol and a carbonyl compound selected from the group consisting of an aldehyde and a ketone, wherein the oxyalkylated novolac has greater than 0.25 up to nearly 1 mole of carbonyl compound per mole of phenol and 1 to 10 moles of a hydroxyalkylating agent selected from the group consisting of monooxirane ring compounds, alkylene halohydrins and alkylene carbonates per mole of phenolic hydroxyl group, with an acid phosphorus compound of the formula:

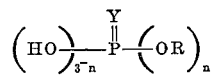

wherein $n$ is an integer from 1 to 2, R is a hydrocarbyl radical and Y is selected from the group consisting of oxygen and sulfur, to an acid number in the range of about 0.2 to about 10,
(2) heating the resulting polyol product to a temperature of at least 160 degrees centigrade, and
(3) reacting the resulting product with an organic polyisocyanate in a proportion to provide at least about 1.5 isocyanate groups per hydroxyl or equivalent group.

19. The process of claim 18 wherein the product of step (2) is dissolved in a solvent having a boiling point in the range of about 50 to about 200 degrees centigrade, the resulting polyol solution is dehydrated to reduce the water content to a value of less than about 100 parts per million of water in the polyol solution, and the resulting polyol in solution is thereafter reacted with the organic polyisocyanate.

20. The process of claim 19 wherein the acid phosphorus compound is an alkyl acid phosphate, the novolak resin is a product of phenol and an aldehyde, and the novolak resin is hydroxyalkylated with an alkylene oxide.

21. The process of claim 20 wherein the alkyl acid phosphate is butyl acid phosphate and the aldehyde is formaldehyde.

22. The process of claim 19 wherein the polyol of step (2) is admixed with an auxiliary polyhydroxy compound prior to dissolution in the solvent.

23. The composition of claim 9 wherein the auxiliary polyhydroxy compound is a polyester of a dicarboxylic compound and a dihydric alcohol.

References Cited

UNITED STATES PATENTS

| 2,788,335 | 4/1957 | Barthel | 260—2.5 |
| 3,054,756 | 9/1962 | Holtschmidt et al. | 260—2.5 |
| 3,257,337 | 6/1966 | Schoepfle et al. | 260—77.5 |

FOREIGN PATENTS

| 1,345,262 | 10/1963 | France. |
| 731,709 | 4/1966 | Canada. |

DONALD E. CZAJA, Primary Examiner
WILLIAM E. PARKER, Assistant Examiner

U.S. Cl. X.R.

260—2.5, 50, 59, 31.2, 31.4, 32.8, 33.6, 33.8, 77.5